May 21, 1957 D. H. PRUTTON 2,792,729
FOLLOWER GUIDE FIXTURE
Filed Jan. 13, 1956 5 Sheets-Sheet 1

Fig. 1

INVENTOR.
DANIEL HOWARD PRUTTON
BY
Hyde, Meyer, Baldwin & Doran
ATTORNEYS

INVENTOR.
DANIEL HOWARD PRUTTON
BY
ATTORNEYS

May 21, 1957

D. H. PRUTTON 2,792,729

FOLLOWER GUIDE FIXTURE

Filed Jan. 13, 1956

INVENTOR.
DANIEL HOWARD PRUTTON
BY
Hyde, Meyer, Baldwin & Doran
ATTORNEYS

United States Patent Office 2,792,729
Patented May 21, 1957

2,792,729

FOLLOWER GUIDE FIXTURE

Daniel Howard Prutton, Cleveland, Ohio

Application January 13, 1956, Serial No. 559,040

23 Claims. (Cl. 80—7)

This invention relates to improvements in an attachment for a form rolling machine and more particularly to an attachment having a workpiece guide element to provide a guiding action for the workpiece during the form rolling.

One of the objects of the present invention is to provide a form rolling machine attachment having a workpiece guide element moved in generally the same direction and at generally the same speed as the advancing direction and speed of the workpiece during form rolling.

A further object of the present invention is to provide a form rolling machine attachment having a guide element spindle telescopically associatable within a hollow cylindrical workpiece or having a guide element sleeve telescopically associatable over a cylindrical guide surface on a workpiece to provide guiding action during form rolling.

A further object of the present invention is to provide an attachment for a form rolling machine including a guide element adapted to aid in preventing hollow workpiece collapse, in maintaining rolled form concentricity with the workpiece axis (such as a hollow workpiece bore or a cylindrical peripheral guide or pilot surface), in maintaining rolled form axis orientation, and/or in minimizing rolled form damage during rolling.

A further object of the present invention is to provide a form rolling machine attachment having a guide element telescopically associatable with the workpiece for guiding action during form rolling and having means for moving said element between guide and released positions.

A further object of the present invention is to provide a form rolling machine attachment having a guide element for providing guiding action during form rolling, having a workpiece feeder for feeding workpieces one at a time into the machine, and having drive means for moving the guide element and feeder in generally the same direction at generally the same speed corresponding to the advancing direction and speed of the workpiece to permit operative association between the guide element and workpiece.

A further object of the present invention is to provide a workpiece guide element movable perpendicular to the direction of workpiece advance between a workpiece associatable guide position for form rolling and another position spaced from the path of workpiece travel.

A further object of the present invention is to provide an attachment for a form rolling machine characterized by its structural simplicity, superior operating characteristics, operating efficiency, and ease of operation or use.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 9 is a vertical sectional view taken along the line 9—9 of Fig. 6;

Fig. 11 is an enlarged vertical sectional view, corresponding to a portion of the left-hand side of Fig. 2, of a second form of the machine attachment with a different type workpiece guide head and a male type workpiece guide element; while Figs. 12 and 12a are sectional views taken along the line 12—12 in Fig. 11 corresponding respectively with the Figs. 6 and 7 views.

Before the form rolling machine attachment here illustrated is specifically described, it is to be understood that the invention here involved is not limited to the structural details or arrangement of parts here shown since mechanisms embodying the present invention may take various forms. It also is to be understood that the phraseology or terminology herein employed is for purposes of description and not of limitation since the scope of the present invention is denoted by the appended claims.

Those familiar with this art will recognize that the present invention may be applied in many ways, but it has been chosen to illustrate the same in connection with a planetary type form rolling machine of known type. This invention, in its broader aspects, may be used during rolling of threads or any other suitable forms on workpieces; may be used with flat, reciprocatable rolling dies or with cylindrical type planetary rolling dies; may be used for form rolling on a workpiece periphery or bore; etc. However, it is illustrated herein as an attachment for a machine for rolling threads on cylindrical peripheral surfaces of solid cylindrical workpieces 22 in Figs. 1–9 or hollow cylindrical workpieces 122 in Figs. 11–12a. Both forms of the invention (the first in Figs. 1–9 and the second in Figs. 11–12a) have many parts in common so only the differences will be emphasized.

Figure 1:
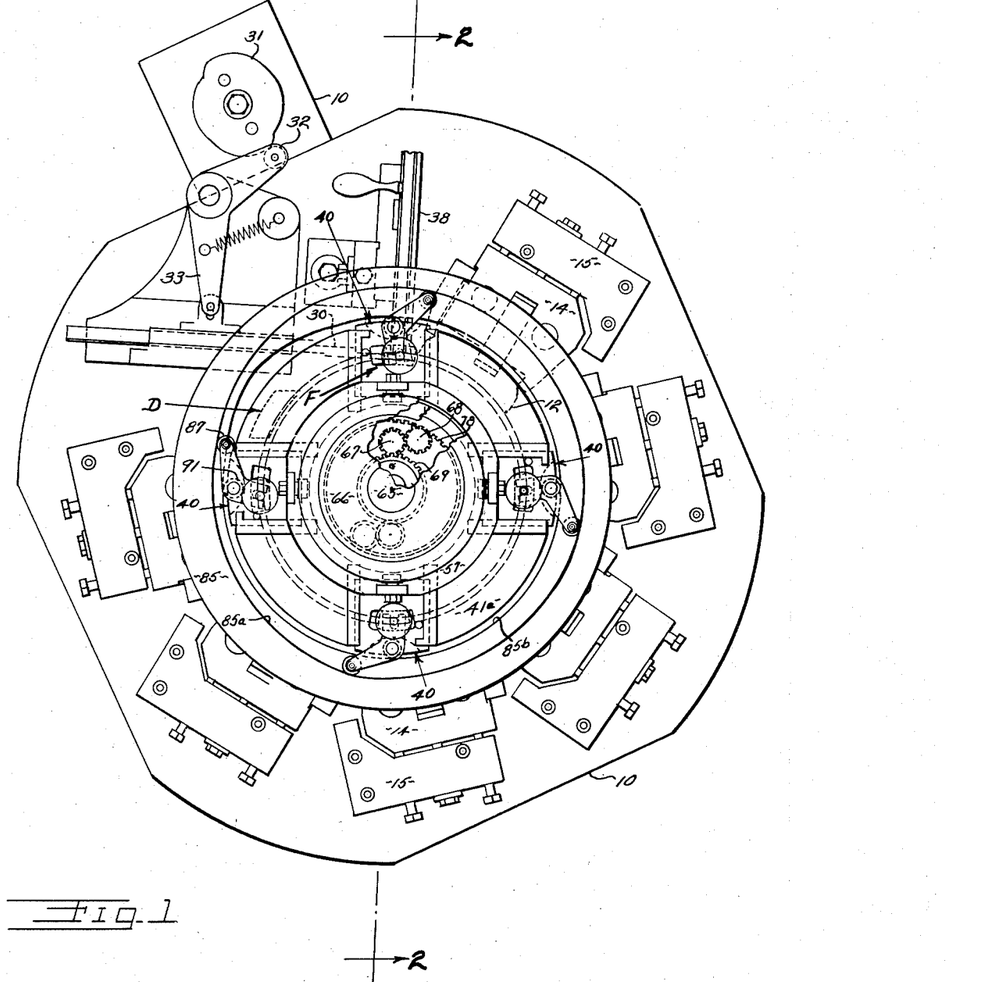
Fig. 1 is a top plan view of a form rolling machine having secured thereto a first form of the attachment of the present invention.

The form rolling machine includes in general a frame having fixedly connected thereto in Fig. 1 table 10 and central column 11 adapted to be located stationary on the floor. Table 10 has secured thereto in Fig. 3 a plurality of form rolling dies 12, each secured to table 10 by a die holding block 14 and a back stop block 15 to form an outer form rolling member stationary on the machine. A ring-shaped die or inner form rolling member 18 is rotatably mounted on the machine frame. Here, a motor, or any other suitable means, is provided for rotating hub 19 in Figs. 2 and 3 about its vertical central axis. Ring die 18 is secured to hub 19 by a plurality of bolts 20 so that it will rotate relative to the outer dies 12 to provide the form rolling action. The dies 12 and 18 have respectively generally cylindrical surfaces 12a and 18a spaced or otherwise located approximately the same distance apart throughout their circumferential length to form a gap within which the peripheral cylindrical surface of workpiece 22 or 122 rolls against the surfaces from the feeding station F to discharge station D located respectively approximately at 12 o'clock and at 9 to 10 o'clock in Fig. 2. Of course, the gap narrows very slightly in the workpiece advancing, or clockwise, direction from station F to D to provide the form rolling action. Then, as inner die 18 is rotated clockwise in Figs. 1 and 3, the workpieces 22 or 122 are moved in the advancing direction along a plane perpendicular to the axis of rotation of the workpieces 22 or 122 and the hub 19.

Figure 3:
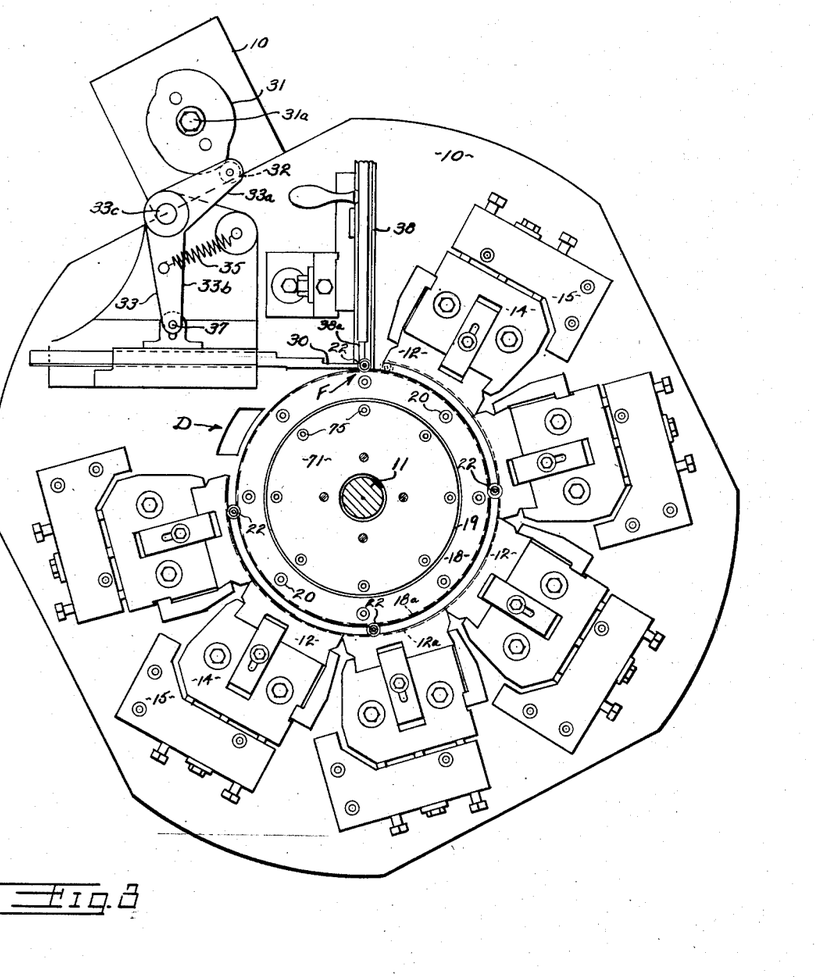
Fig. 3 is a horizontal sectional view taken along the line 3—3 of Fig. 2.

A workpiece feeder is provided at the feeding station F for feeding workpieces 22 or 122 by feeder finger 30 one at a time into the gap between the dies 12 and 18 at approximately the 12 o'clock position in Figs. 1 and 3. Drive means is provided for reciprocating feeder finger 30 back and forth in proper timed relationship. Here, vertical shaft 31a is mounted in table 10 for rotation about its vertical axis in timed relationship with the rotatable hub 19 through suitable interconnecting gearing (not shown) of any conventional type. Shaft 31a has secured thereto the cam 31 for oscillating a cam follower roller 32 rotatably secured to the outer end of arm 33a of bell crank 33 pivotally secured to the table 10 at pivot 33c. Tension spring 35, secured at opposite ends to bell crank arm 33b and table 10, biases crank 33 in the counterclockwise direction about pivot 33c to urge follower 32 against cam 31 and biases feeder finger 30 toward the right in Fig. 1. A lost motion pin and slot connection 37 is provided between the distal end of bell crank arm 33b and feeder finger 30 to permit relative movement therebetween so that oscillation of crank 33 will cause feeder finger 30 to reciprocate back and forth along its longitudinal axis in its guide secured to table 10. Cam 31 and the linkage connecting it with the feeder finger 30 are designed so that the feeder finger 30 moves during the feeding stroke toward the right in Fig. 1 generally tangentially to inner die 18 and at generally the same speed (at least during the end part of the feeding stroke) as the advancing speed of workpiece 22 or 122 during the form rolling operation. The workpieces are advanced downwardly by gravity along slot 38a in chute 38 secured to table 10 so that the lead workpiece is in alignment with the feeder finger 30, as shown in Fig. 3. Then, as the feeder finger 30 is reciprocated toward the right in Fig. 3, it feeds the lead workpiece 22 or 122 toward the right between the dies 12 and 18. The feeding speed can be accurately controlled since both the feeding finger 30 and the speed of workpiece 22 or 122 are responsive to the relative rotational movement of dies 12 and 18. The reason for this speed relationship between feeder finger 30 and workpiece travel during form rolling will be more apparent later in the description.

Figure 2:
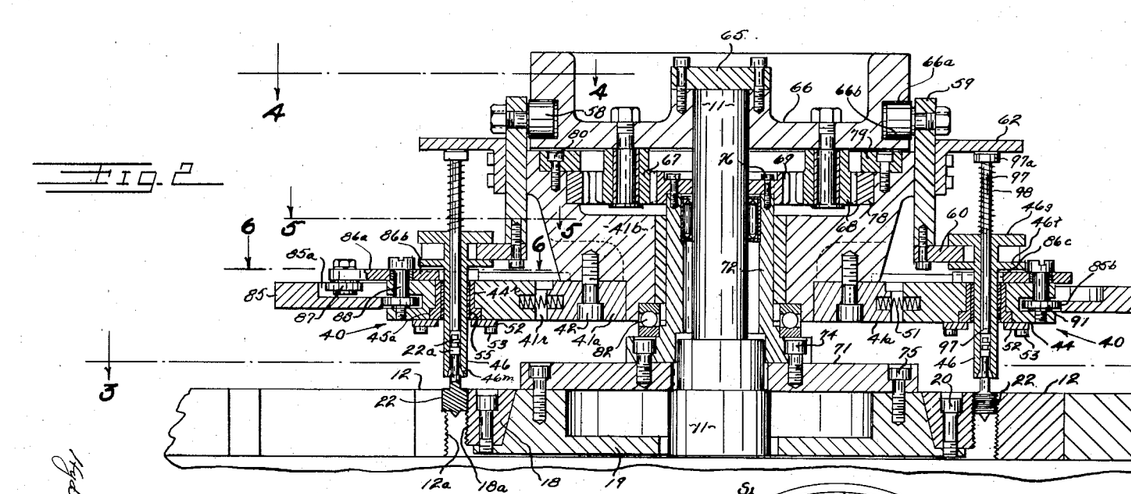
Fig. 2 is a transverse vertical section taken along the line 2—2 of Fig. 1 but with the workpiece guide head rotated clockwise from the Fig. 1 position until the female type guide element is telescoped over a cylindrical guide surface of the workpiece.
Figures 11, 12, 12A:
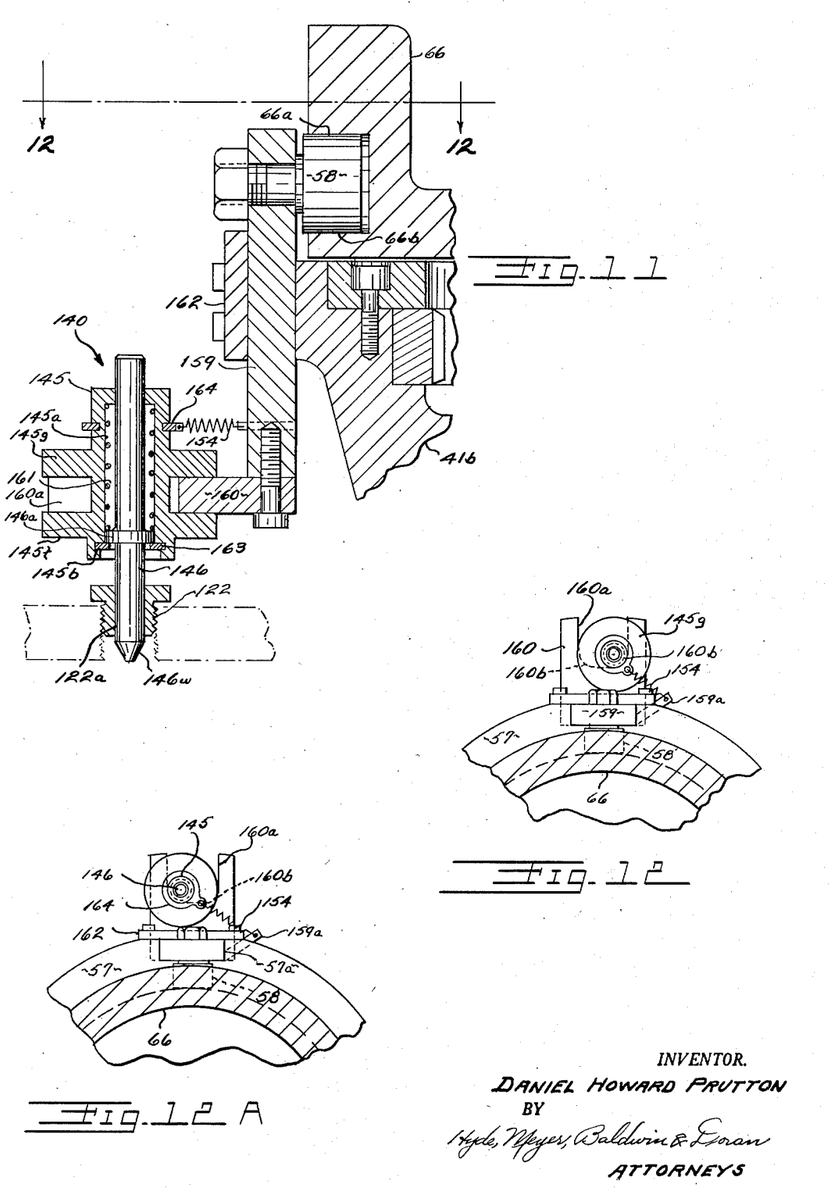

A plurality of workpiece guide heads 40 are provided in Figs. 1 and 2, here shown as four in number, connected together by an integral frame adapted to rotate coaxially with hub 19 in the direction of workpiece advance, i. e., clockwise in Figs. 1 and 3. The frame includes annular frame members 41a and 41b secured together by bolts 42 in Fig. 2. A similar construction is shown in Fig. 11 but with only one workpiece guide head 140 shown of the four carried by frame member 41b. Although the guide heads 40 and 140 have respectively a female sleeve 46 and a male spindle 146 as workpiece guide elements, it will be apparent as the description proceeds that either guide element may be used with either head and either workpiece may be roll formed with either head after suitable slight modification since the parts are generally interchangeable. Each guide element 46 or 146 is telescopically associatable respectively with a mating workpiece 22 or 122 for providing guiding action during form rolling. Also, the guide head 40 construction is preferred over guide head 140 for guiding workpieces especially difficult to thread accurately because the workpiece is made of extremely soft material, has only a short axial thread length, etc.

Figure 8:
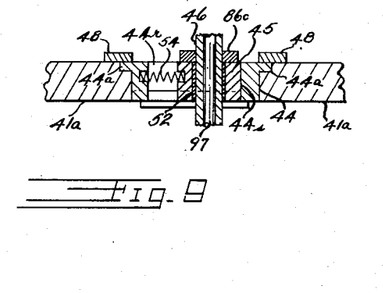
Fig. 8 is a sectional view corresponding to Fig. 6 but at the discharge station corresponding roughly with the 10 o'clock position in Figs. 1 and 2.

Each workpiece guide head 40 includes a cross slide 44 in Fig. 8, a longitudinal slide 45, and a workpiece guide element sleeve 46 operatively connected together. Frame member 41a has at each guide head 40 a recess 41r in Fig. 6 extending inwardly from its outer periphery within which reciprocates cross slide 44 in radial inwardly and outwardly directions and generally perpendicular to the direction of workpiece advance. Each cross slide 44 in Fig. 9 has integral ribs 44a projecting outwardly from opposite sides for slidable retention in frame member 41a by retaining strips 48 secured to frame member 41a by bolts 49 in Fig. 6. Springs 51 in Fig. 8 normally bias slide 44 to its radially outward position with respect to frame member 41a. The longitudinal slide or guide element carrier 45, operatively connected between cross slide 44 and guide element 46, is movable in back and forth directions relative to frame member 41a and cross slide 44 along the circumferential direction of workpiece travel. Longitudinal slide 45 is movable along the direction of workpiece travel within the arcuately shaped cross slide recess 44r, and slide 45 is retained therein by integral longitudinal slide ribs 45a projecting outwardly from opposite sides thereof in Fig. 2 retained in sliding relationship in cross slide 44 by slide retainer strips 52 secured by bolts 53 to slide 44. A spring 54 is also provided in Figs. 6 and 9 to normally bias longitudinal slide 45 to the Fig. 6 position against stop surface 44s forming the right end of recess 44r. In Fig. 2, guide element sleeve 46 is capable of telescoping over a pilot diameter or cylindrical peripheral guide surface 22a on workpiece 22 because the sleeve 46 is mounted not only for rotation but also endwise movement in a bearing 55 carried by slide 45.

Workpiece guide head 140 in Figs. 11, 12 and 12a has guide element spindle 146 telescopically carried within bore 145a of necked controlling sleeve 145. Both spindle 146 and sleeve 145 normally move up and down together because compression coil spring 161 urges spindle shoulder 146a downwardly against a snap ring 163 in a bore groove 145b of sleeve 145. A U-shaped recess 160a in yoke 160 fits slidably within the neck between flanges 145f, 145g of sleeve 145 to provide a sliding fit to permit movement between sleeve 145 and yoke 160, while keeping spindle 146 always perpendicular to the travel plane of workpiece 122. Tension spring 154, secured at opposite ends to arm 159a in Fig. 12a carried by slide 59 and to a spring retainer snap ring 164 snapped into a peripheral groove in sleeve 145, resiliently urges sleeve 145 and guide element 146 diagonally into the lower right-hand corner 160b of U-shaped recess 160a forming a stop for the carrier 145 when it is not being pulled away therefrom by workpiece travel. Also, spring 154 holds sleeve 145 in assembled position in yoke 160.

In guide head 140 in Fig. 11, it may be desirable to reduce the overhang of spindle 146 beyond sleeve 145 since frame member 41a and its slides in Fig. 2 are not used. This may take the form, for example, of using a slide 59 in Fig. 11 of longer length than in Fig. 2, using the bearing 82 of Fig. 2 of less height in Fig. 11, etc.

Figure 4:
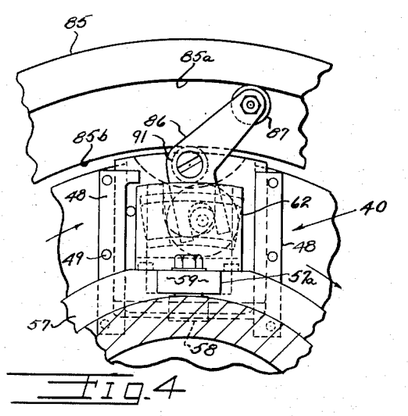
Fig. 4 is a horizontal sectional view taken along the line 4—4 of Fig. 2.
Figure 5:
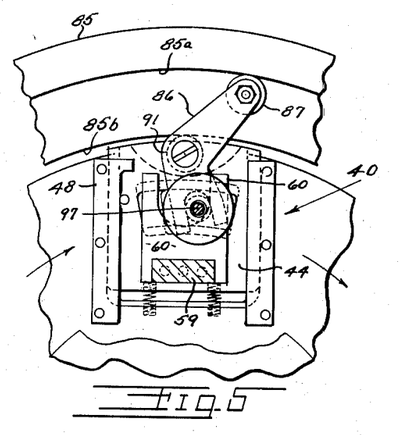
Fig. 5 is a horizontal sectional view taken along the line 5—5 of Fig. 2.

In each form, the workpiece guide head 40 or 140 has means for moving the workpiece guide element endwise in opposite directions perpendicular to the direction of workpiece travel (in the vertical direction in Figs. 2 or 11 perpendicular to the horizontal plane of workpiece travel). The element 46 or 146 is movable between the guide position shown in Figs. 2 or 11 and a release position with the element elevated above the Fig. 2 or 11 position out of contact with the workpiece 22 or 122 by having the element 46 or 146 telescoped off the workpiece 22 or 122. Here, a cam including cam surfaces 66a and 66b in Fig. 2, is formed by a peripheral groove in cap 66 secured by cap 65 to column 11 to provide a cam fixed in a stationary position relative to central column 11. Operatively connecting said cam and element 46 or 146 is roller follower 58 between these cam surfaces rotatably mounted on a pin carried by vertical slide 59 for reciprocating a U-shaped yoke 60 or 160 held within an annular neck between flanges 46f, 46g or 145f, 145g on sleeve 46 or 145 for rotatably carrying the workpiece carrier guide element 46 or 146 for each guide head 40 or 140 between these positions, for positioning it vertically, and for independently moving it in a vertical direction. A ring 57 in Figs. 4 and 12a is secured in any suitable manner around and to frame member 41b and has a plurality of vertical, outwardly opening grooves 57a, one for each slide 59, to provide slide ways for slides 59 with the cover caps thereof formed by brackets 62 or cover plates 162 bolted thereto. Hence, each slide 59 is operatively connected to frame member 41b for endwise vertical reciprocation by cam surfaces 66a, 66b and each element 46 or 146 is rotatably carried by its yoke 60 or 160.

Drive means is provided for each guide element 46 or 146 for moving it in generally the same direction and at generally the same speed corresponding to the advancing clockwise direction and speed of its associated workpiece 22 or 122. In the illustrated construction, this is approximately one-half the speed of the relative movement or rotation of dies 12 and 18. In the present disclosure, this drive means breaks down conveniently into two separate mechanisms with a main or first mechanism providing drive to the guide head frame members 41a and 41b at substantially one-half the speed of this relative movement and with a second mechanism for permitting movement of guide element 46 or 146 relative to frame member 41a to compensate for the curvature of the cylindrical surfaces 12a and 18a of the dies.

Figure 10:
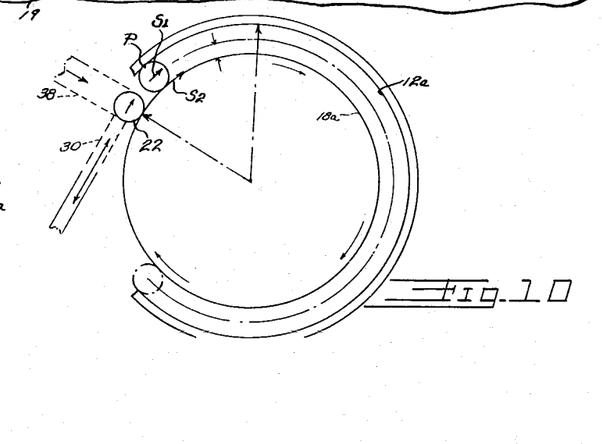
Fig. 10 is a pictorial representation of the machine and attachment operation.

The basic theory is shown diagrammatically in Fig. 10 with arrows S1 and S2 portraying respectively the forward travel speeds of the workpiece 22 or 122 and die surface 18a clockwise about their respective arcs. If die surfaces 12a and 18a were flat instead of curved, the forward velocity S2 would be double the forward velocity S1 as the workpiece 22 or 122 rotates about its instantaneous center P on stationary die surface 12a. This half-speed ratio is provided by the first mechanism. However, velocity S1 travels around an arc of greater circumference than velocity S2 so that the forward travel speed of workpiece 22 or 122 is somewhat slower than the half-speed ratio; the second mechanism compensates for the curvature of the cylindrical surfaces 12a and 18a and the arcuate path of workpiece 22.

The first mechanism provides the half-speed ratio with a planetary gear drive operatively connecting members 12 and 18 and guide head frame member 41b. Here, one or more pairs of meshing planet gears 67, 68 drivingly interconnect sun gear 69 and ring gear 78 in Figs. 1 and 2. The planet gears 67, 68 have their axes of rotation secured in a stationary position by having them rotatably mounted on pins secured to cap member 66 secured to the top of the stationary central column 11 of the machine through cap plate 65. The sun gear 69 is rotatably carried with the inner die 18 since it is secured to the rotatable hub 19 by plate 71, sleeve 72 and bolts 74, 75 and 76. The ring gear 78 is secured to frame member 41b by clamp plate 79 and bolts 80. Since the pitch diameter of the teeth on ring gear 78 is twice the pitch diameter of gear 69, the rotational speed of frame member 41b will be one-half that of inner die 18 as it rotates on bearing 82 and sleeve 72.

The second mechanism provides a sliding connection between the guide element and frame to permit relative movement of the guide element relative to the frame member 41b along the gap between the dies so as to compensate for the curvature of the cylindrical surfaces and path of workpiece travel. This takes the form of the sliding connection in Fig. 8 between slides 44 and 45 and in Figs. 11–12a between yoke recess 160a and sleeve 145 with slide 45 and sleeve 145 forming slide type guide element carriers each movable in back and forth directions relative to frame member 41b along the line of workpiece travel.

Figure 6:
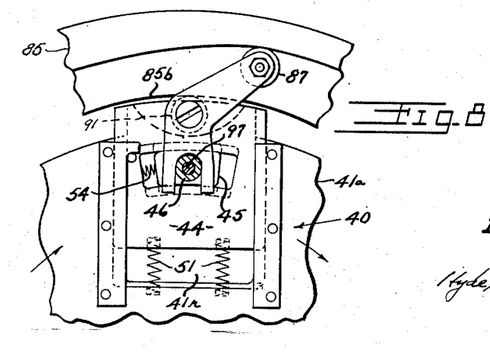
Fig. 6 is a horizontal section view taken along the line 6—6 of Fig. 2.

Means is provided in Fig. 6 for positively driving guide element 46 relative to frame member 41b to accurately provide said compensation. This means includes a cam plate 85 in Figs. 1, 2, 6 and 7 secured in any suitable manner in stationary fashion to the machine frame, such as to table 10; and a bell crank 86 pivotally connected to cross slide 44 by pivot pin 88. The bell crank has an arm 86a having a roller follower 87 coacting with cam surface 85a on plate 85 while the other bell crank arm 86b has a bifurcated end 86c straddling sleeve 46. As the workpiece 22 or 122 travels clockwise from the feeding station F to the discharge station D, cam surface 85a swings bell crank 86 clockwise about its pivot pin 88 from the Fig. 6 to Fig. 7 position so as to move longitudinal slide 45 relative to frame member 41b along the line of workpiece travel in the backward direction against the bias of spring 54 since velocity arrow S1 in Fig. 10 has a longer path to travel than velocity arrow S2.

In Figs. 11–12a, the compensating movement of guide spindle 146 permitted by said second mechanism is caused by the spindle being forced to move along with the workpiece 122 as it is advanced by the relative movement of dies 12 and 18.

If this guide fixture is used with flat, reciprocating dies instead of planetary dies, a half-speed ratio, provided herein by the first drive means, would be adequate since no curvature of the die surfaces exist.

Alternate constructions readily suggest themselves. If the teeth of gears 78 and 69 are in a different ratio than 2 to 1, so that the frame member 41b travels at a predetermined portion of the relative speed different from the half-speed ratio, then cam surface 85a and other associated parts may be redesigned to provide a different amount of circumferential movement to longitudinal slide 45 to compensate not only for the curvature but also the variation in the predetermined portion from the half-speed ratio. Of course, slide 45 may be moved in either the back or forth direction in recess 44r as the workpiece guide head 40 advances in the clockwise direction through the machine. The choice of advancing or retraction movement of slide 45 will be determined by the ratio of the gear teeth on gears 69 and 78 and the curvature of the cylindrical surfaces and of the path of travel of workpiece 22 or 122.

It should be noted that, with the 2 to 1 speed ratio disclosed, rolling threads with multiple starts is easily achieved since the inner and outer dies 18 and 12 will be in proper registration so that the workpiece 22 or 122 carried therebetween by any of the guide heads 40 will be at a matched point.

Other cams are also provided for giving the desired motion to the parts. The radial movement of cross slide 44 may be controlled by a cam surface 85b in Figs. 2, 7 and 8 on cam plate 85. Roller follower 91, rotatably mounted on pivot pin 88, follows the cam surface 85b while springs 51 in Fig. 8 bias it against this surface to determine the radial position of cross slide 44.

The mode of operation and timing of this machine is specifically designed for high speed feeding and accurate form rolling of workpieces. At feeding station F, a workpiece 22 or 122 is fed from chute 38 by feeder finger 30, the workpiece is brought up to approximately the proper speed for roll form travel between the dies, guide element 46 or 146 is moved downwardly from its released position to its guide position shown in Fig. 2 or 11 into telescopic association with the workpiece 22 or 122, and the guided workpiece begins its travel between dies 12 and 18 either before or after this telescopic association. Although the exact timing of the components would depend upon the working conditions encountered, only one satisfactory sequence will be described. Feeder finger 30 pushes the end workpiece in chute 38 in generally the same direction and in generally the same speed (during at least the end portion of its feed stroke) corresponding to the advancing direction and speed of the workpiece between the dies. Guide element 46 or 146 continually travels at approximately this speed. Since it is moving approximately synchronously with and directly over the workpiece, cam surface 66a forces the guide element down into telescopic association with the workpiece to provide the guiding action. Cam surface 85b in Figs. 6 and 8 can be designed to bring cross slide 44 radially inwardly during this movement, if necessary, to allow for the tangential movement of feeder finger 30 in contrast with the arcuate movement of the workpiece between the dies. Hence, during some portion of the feed stroke, feeder finger 30, workpiece 22 or 122 and guide element 46 or 146 are all moving at the same speed and in generally the same direction to permit this operation.

Of course, the machine can be so timed that the guide element does not move into telescopic association with the workpiece until after it has entered the gap between dies 12 and 18. This timing is preferred with the head construction in Figs. 12 and 12a.

It should be noted that in both constructions the guide element is positively located in a definite position so that it can be telescoped with its workpiece at feeding station F. Spring 54 or 154 in Figs. 6 or 12 serve as resilient means for biasing guide element carrier 45 or 145 against stop surface 44s on slide recess 44r or arcuate stop surface 160b on yoke 160 so that guide element 46 or 146 is definitely located in position for telescopic association.

Suitable means may be provided in each head 40 or 140 to compensate for any misalignment between guide element and workpiece. The elements 46 and 146 have annular tapered workpiece engagement surfaces 46m and 146m for this purpose. Also, springs 51 and 54 in Fig. 8, spring 154 in Fig. 12, and the outwardly open mouth of the U-shaped recesses in yokes 60 and 160 permit a limited amount of relative movement between the components. Also, spring 161 in Fig. 11 permits relative movement between spindle 146 and sleeve 145 to prevent part breakage and jamming while still returning shoulder 146a against stop ring 163.

As the workpiece 22 or 122 travels clockwise between the feeding station and discharge station respectively shown at F and D, guide element 46 or 146 moves clockwise at the same speed and along the same path with frame member 41b moving at a slightly faster speed than guide element 46 or 146. During movement from Figs. 6 to 7, cam surface 85a moves longitudinal slide 45 gradually in the backward direction from the Figs. 6 to 7 positions. Also, cam surface 85b keeps cross slide 44 in approximately the same radial position throughout the length of the travel determined by the radius dimension of die surface 18a.

Of course, the travel of longitudinal slide 45 in Fig. 6 need not be controlled by cam surface 85a if the force required to overcome spring 54 and move the slide 45 will not be harmful to the workpiece being form rolled. Spring 54 will bring the slide 55 back to the Fig. 6 position at the feeding station F when assembly with the workpiece is made, and then the slower travel of the workpiece will cause the slide to move to the Fig. 7 position against the bias of the spring 54. For example, during movement from Fig. 12 to 12a, the relative movement of dies 12 and 18 causes the workpiece and its guide element to move relative to frame member 41b against the tension of spring 154.

Figure 7:
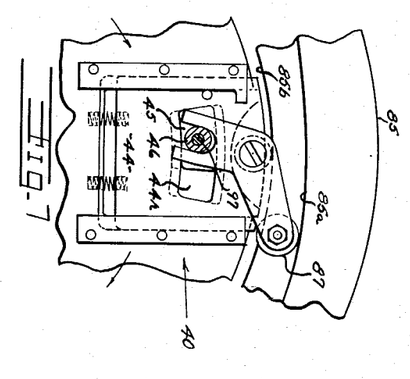
Fig. 7 is a horizontal sectional view, corresponding to Fig. 6, with the workpiece about to leave the form rolling dies and corresponding approximately with the position of the workpiece guide element at the 9 o'clock position in Figs. 1 and 2.

At the discharge station D after workpiece 22 leaves die 12, cam surface 85b in Fig. 8 permits cross slide 44 to move radially outwardly from the form rolling position in Fig. 7 to the release position in Fig. 8 to move the workpiece 22 or 122 radially outwardly from engagement with the inner die surface 18a. Also, cam surface 66b pulls guide element 46 upwardly from its guide position in Fig. 2 to a released position. If the workpiece is not immediately disassembled from the guide element, ejector rod 97 in Fig. 2 forces it from the sleeve guide element 46 as the sleeve telescopes upwardly thereover. The ejector rod 97 is normally biased out of workpiece engagement by having its upper head 97a in Fig. 2 biased upwardly by spring 98 against outwardly extending bracket 62. Of course, if workpiece 22 is roll formed by the guide head in Fig. 11, bracket 62 will have to be substituted for cover plate 162.

The discharge station D for the construction in Figs. 11–12a preferably is located with the workpiece 122 still between die surfaces 12a, 18a during the burnishing operation immediately before it leaves die surface 12a at 9 o'clock in Fig. 3. Then, cam surface 66b pulls guide element 146 upwardly from its guide position in Fig. 11 to a released position so that workpiece 122 will automatically drop from the machine as it travels free of die surface 12a.

These constructions have many advantages. They provide high speed workpiece feeding while providing workpiece guiding throughout the form rolling operation. The guide elements 46 and 146 in both Figs. 2 and 11 maintain the roll form concentricity with the respective cylindrical surfaces 22a and 122a on the workpieces engaged by the guide elements; maintain the axis of the roll form generally coaxial therewith, neither inclined nor laterally spaced therefrom; and minimize roll form damage. These features are especially important when the workpiece is formed of soft material or has a form to be rolled thereon of extremely short axial length. When the workpiece guide element takes the form of the spindle 146 in Fig. 11, any tendency to collapse the hollow workpiece or deform the cylindrical shape of the bore therein is prevented by the back-up of the spindle against the bore surface.

Alternate constructions readily suggest themselves. First, under some conditions, the cam surface 85a and bell crank 86 in Fig. 6 may be eliminated with spring 54 serving as the sole means for positioning slides 45 in the manner mentioned in further detail heretofore. Second, no cam surface 85b in Fig. 7 is necessary if the slide 44 does not have to move in the radial direction but instead is an integral part of the frame member 41a or is otherwise secured thereto. Three different groups of cam surfaces have been illustrated—surfaces 66a, and 66b, 85a and 85b. The first group is shown on the column 11 while the other two are secured to the table 10. Since all three of these cam surfaces are stationary and table 10 and column 11 are also stationary, each cam surface may be secured to table 10 or column 11, whichever is most convenient.

Various changes in details and arrangement of parts can be made by one skilled in the art without departing from either the spirit of this invention or the scope of the appended claims.

What I claim is:

1. In an attachment for a machine for rolling forms on cylindrical surfaces of workpieces wherein first and second members have surfaces spaced apart to form a gap within which the workpiece cylindrical surface rolls against the surfaces of said members as one of said members moves relative to the other to move the workpieces in an advancing direction in said gap, a workpiece guide element associatable with the workpiece for guiding action during form rolling, and guide element drive means responsive to relative movement of said members for moving said guide element in generally the same direction at generally the same speed corresponding to the advancing direction and speed of said workpiece.

2. In an attachment for a machine for rolling forms on cylindrical surfaces of workpieces wherein first and second members have surfaces spaced apart to form a gap within which the workpiece cylindrical surface rolls against the surfaces of said members as one of said members moves relative to the other to move the workpieces in an advancing direction in said gap, a workpiece guide element associatable with the workpiece for guiding action during form rolling, and guide element drive means responsive to relative movement of said members for moving said guide element relative to each member at approximately one-half the speed of said relative movement with said guide element moving in generally the same direction at generally the same speed corresponding to the advancing direction and speed of said workpiece.

3. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap, a workpiece guide element associatable with the workpiece for guiding action during form rolling, and guide element drive means responsive to relative movement of said members for moving said guide element relative to each member at approximately one-half the speed of said relative movement with said guide element moving in generally the same direction at generally the same speed corresponding to the advancing direction and speed of said workpiece, said guide element drive means including a first mechanism providing drive to a frame for carrying said guide element at substantially one-half the speed of said relative movement and including a second mechanism permitting movement of said guide element relative to said frame to compensate for the curvature of the cylindrical surfaces of said members.

4. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap, a workpiece guide element associatable with the workpiece for guiding action during form rolling, and guide element drive means responsive to relative movement of said members for moving said guide element relative to each member at approximately one-half the speed of said relative movement with said guide element moving in generally the same direction at generally the same speed corresponding to the advancing direction and speed of said workpiece, said guide element drive means including a first mechanism providing drive to a frame for carrying said guide element at a predetermined portion of the speed of said relative movement and including a second mechanism permitting movement of said guide element relative to said frame to compensate for the curvature of the cylindrical surfaces of said members and said predetermined portion.

5. The combination of claim 4 wherein said second mechanism includes a sliding connection between said guide element and frame and the advancing travel of said workpiece caused by the relative movement of said members causes said relative movement of said guide element permitted by said second mechanism.

6. The combination of claim 4 wherein means are provided responsive to relative movement of said members for positively driving said guide element relative to said frame to accurately provide said compensation.

7. The combination of claim 4 wherein said second mechanism includes a sliding connection between said guide element and frame to permit element travel along said gap relative to said frame and includes a stop on said frame, and wherein the combination includes resilient means for urging said element against said stop.

8. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap, a workpiece guide element associatable with the workpiece for guiding action during form rolling, and guide element drive means responsive to relative movement of said members for moving said guide element relative to each member at approximately one-half the speed of said relative movement with said guide element moving in generally the same direction and at generally the same speed corresponding to the advancing direction and speed of said workpiece, said guide element drive means including a planetary gear drive operatively connecting said members and guide element.

9. In an attachment for a machine for rolling forms on cylindrical surfaces of workpieces wherein first and second members have surfaces spaced apart to form a gap within which the workpiece cylindrical surface rolls against the surfaces of said members as one of said members moves relative to the other to move the workpieces in an advancing direction in said gap, a workpiece feeder for feeding workpieces one at a time into said gap, a workpiece guide element associatable with the workpiece for guiding action during form rolling, and guide element and feeder drive means responsive to relative movement of said members for moving during feeding said guide element and feeder relative to one of said members in generally the same direction at generally the same speed.

10. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members from feeding to discharge stations as one of said members rotates relative to the other to move the workpieces in an advancing direction in said gap, a workpiece feeder at said feeding station for feeding workpieces one at a time into said gap, a workpiece guide element for guiding action during form rolling associatable with the workpiece by movement perpendicular to the direction of workpiece travel, means responsive to the relative movement of said members for moving said workpiece guide element in opposite directions perpendicular to the direction of workpiece travel between workpiece assembled and disassembled positions at said feeding and discharge stations respectively, guide element and feeder drive means responsive to relative movement of said members for moving during feeding said guide element and feeder and for moving during form rolling said guide element relative to at least one of said members in generally the same direction at generally the same speed corresponding to the advancing direction and speed of said workpiece, said guide element drive means including a first mechanism providing drive to a frame for carrying said guide element at substantially one-half the speed of said relative movement and including a second mechanism permitting movement of said guide element relative to said frame to compensate for the curvature of the cylindrical surfaces of said members, said second mechanism including a sliding connection between said guide element and frame to permit element travel along said gap relative to said frame, a stop on said frame, and resilient means operatively urging said element against said stop to a position therebetween for permitting guide element association with the workpiece at said feeding station.

11. In an attachment for a machine for rolling forms on cylindrical surfaces of workpieces wherein first and second members have surfaces spaced apart to form a gap within which the workpiece cylindrical surface rolls against the surfaces of said members as one of said members moves relative to the other to move the workpieces in an advancing direction in said gap, a workpiece guide element providing guiding action during form rolling telescopically associatable with the workpiece by movement perpendicular to the direction of workpiece travel, means responsive to the relative movement of said members for moving said workpiece guide element perpendicular to the direction of workpiece travel between workpiece assembled and disassembled positions, and guide element drive means responsive to relative movement of said members for moving said guide element in generally the same direction at generally the same speed corresponding to the advancing direction and speed of said workpiece.

12. The combination of claim 11 wherein said workpieces are hollow and cylindrical, and said guide element is a spindle telescopically associatable within the workpiece, whereby said spindle aids in preventing workpiece collapse and in maintaining rolled form concentricity with the hollow workpiece bore.

13. The combination of claim 11 wherein said workpieces have cylindrical peripheral guide surfaces, and said guide element is a sleeve telescopically associatable over said guide surface, whereby said sleeve aids in maintaining rolled form concentricity with the workpiece guide surface.

14. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap, a workpiece feeder for feeding workpieces one at a time into said gap, a workpiece guide element providing guiding action during form rolling telescopically associatable with the workpiece by movement perpendicular to the direction of workpiece travel, means responsive to the relative movement of said members for moving said workpiece guide element perpendicular to the direction of workpiece travel between workpiece assembled and disassembled positions, and guide element and feeder drive means responsive to relative movement of said members for moving during feeding said guide element and feeder relative to each member in generally the same direction at generally the same speed, whereby said workpiece guide element aids in maintaining rolled form concentricity with the workpiece, in maintaining rolled form axis orientation, and in minimizing rolled form damage.

15. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap, a workpiece guide head including a frame movable in the direction of workpiece advance and including a workpiece guide element associatable with the workpiece for guiding action during form rolling, and guide element drive means responsive to relative movement of said members for moving said guide element relative to each member at approximately one-half the speed of said relative movement with said guide element and feeder both moving in generally the same direction at generally the same speed corresponding to the advancing direction and speed of said workpiece, said guide element drive means including a main drive means providing drive to said guide head frame at a predetermined portion of the speed of said relative movement, including a guide element carrier operatively connecting said frame and guide element as part of said guide head and movable in back and forth directions relative to said frame along the line of workpiece travel, and including a means for moving said guide element carrier in one of the aforesaid directions for providing drive to said guide element relative to said guide frame to compensate for at least the curvature of the cylindrical surfaces of said members.

16. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members as one of said members rotates relative to the other to move the workpieces in an advancing direction in said gap with one of said members being rotatably mounted and the other member being stationary, a workpiece guide head including a frame movable in the direction of workpiece advance and including a workpiece guide element associatable with the workpiece for guiding action during form rolling, and guide element drive means responsive to relative movement of said members for moving said guide element relative to each member at approximately one-half the speed of said relative movement with said guide element moving in generally the same direction at generally the same speed corresponding to the advancing direction and speed of said workpiece, said guide element drive means including a main drive means providing drive to said guide head frame at a predetermined portion of the speed of said relative movement, including a guide element carrier operatively connecting said frame and guide element as part of said guide head and movable in back and forth directions relative to said frame along the line of workpiece travel, and including a cam fixed relative to said other member for moving said guide element carrier in one of the aforesaid directions for providing drive to said guide element relative to said guide frame to compensate for the curvature of the cylindrical surfaces of said members.

17. In an attachment for a machine for rolling forms on cylindrical peripheral surfaces of cylindrical workpieces wherein first and second members have cylindrical surfaces located approximately the same distance apart to form a gap within which the workpiece peripheral cylindrical surface rolls against the surfaces of said members from feeding to discharge stations as one of said members rotates relative to the other to move the workpieces in an advancing direction in said gap, a workpiece guide head including a frame movable in the direction of workpiece advance, including a slide movable generally perpendicular to said direction of advance between form rolling and released positions respectively at said feeding and discharge stations, including a workpiece guide element associatable with the workpiece for guiding action during form rolling, and including means operatively connecting said slide with the frame and with the workpiece guide element, guide element drive means responsive to relative movement of said members for moving said guide element in generally the same direction at generally the same speed corresponding to the advancing direction and speed of said workpiece, said guide element drive means including a first drive means providing drive to said guide head frame at a predetermined portion of the speed of said relative movement, and means for moving said slide in the aforesaid directions between the aforesaid positions.

18. In an attachment for a machine for rolling forms on cylindrical peripheral surfaces of cylindrical workpieces wherein inner and outer members have cylindrical surfaces located approximately the same distance apart to form a gap within which the workpieces peripheral cylindrical surface rolls against the surfaces of said members as one of said members rotates relative to the other to move the workpieces in an advancing direction in said gap with the inner member being rotatably mounted and the outer member being stationary, a workpiece guide head including a frame movable in the direction of workpiece advance and including a workpiece guide element associatable with the workpiece for guiding action during form rolling, and guide element drive means responsive to relative movement of said members for moving said guide element relative to each member at approximately one-half the speed of said relative movement with said guide element moving in generally the same direction at generally the same speed corresponding to the advancing direction and speed of said workpiece, said guide element drive means including a main drive mechanism providing drive to said guide head frame at a predetermined portion of the speed of said relative movement, including a guide element carrier operatively connecting said frame and guide element as part of said guide head and movable in back and forth directions relative to said frame along the line of workpiece travel, and including a cam fixed relative to said outer member for moving said guide element carrier in one of the aforesaid directions for providing drive to said guide element relative to said guide frame to compensate for the curvature of the cylindrical surfaces of said members, said main drive mechanism including a planetary gear drive operatively connecting said members and guide head frame.

19. In an attachment for a machine for rolling forms on cylindrical peripheral surfaces of cylindrical workpieces wherein first and second members have surfaces located approximately the same distance apart to form a gap within which the workpiece peripheral cylindrical surface rolls against the surfaces of said members from feeding to discharge stations as one of said members moves relative to the other to move the workpieces in an advancing direction in said gap with one of the members being movably mounted and the other being stationary, a workpiece feeder at said feeding station for feeding workpieces one at a time into said gap, a workpiece guide head including a frame movable in the direction of workpiece advance and including a workpiece guide element providing guiding action during form rolling telescopically associatable with the workpiece by movement perpendicular to the direction of workpiece travel between guide and released positions, and including means operatively connecting said frame with the workpiece guide element, means responsive to the relative movement of said members for moving said workpiece guide element in opposite directions perpendicular to the direction of workpiece travel between workpiece assembled position at said feeding station and disassembled position at said discharge station including a cam fixed relative to said stationary member and operatively connected with said element for moving said workpiece guide element perpendicular to the direction of workpiece travel between the aforesaid positions, and guide element and feeder drive means responsive to relative movement of said members for moving during feeding said guide element and feeder and for moving during form rolling said guide element relative to at least the stationary member at approximately one-half the speed of said relative movement with said guide element and feeder both moving in generally the same direction at generally the same speed corresponding to the advancing direction and speed of said workpiece, said guide element drive means including a gear drive operatively connecting said members and guide head frame, whereby said workpiece guide element aids in maintaining rolled form concentricity with the workpiece, in maintaining rolled form axis orientation, and in minimizing rolled form damage.

20. In an attachment for a machine for rolling forms on cylindrical peripheral surfaces of cylindrical workpieces wherein inner and outer members have cylindrical surfaces located approximately the same distance apart to form a gap within which the workpiece peripheral cylindrical surface rolls against the surfaces of said members from feeding to discharge stations as the inner member rotates relative to the outer member to move the workpiece in said gap in an advancing direction in a plane perpendicular to the axis of rotation with the inner member being rotatably mounted and the outer member being stationary, a workpiece feeder at said feeding station for feeding workpieces one at a time into said gap, a workpiece guide head including a frame movable in the direction of workpiece advance, including a cross slide movable in radially inwardly and outwardly directions generally perpendicular to said direction of advance between form rolling and released positions respectively at said feeding and discharge stations, including a workpiece guide element providing guiding action during form rolling telescopically associatable with the workpiece by movement perpendicular to the plane of workpiece travel and to the movement plane of said slide between guide and released positions respectively at said feeding and discharge stations, including a vertical slide operatively connected to said frame for endwise vertical reciprocation and having a yoke rotatably carrying said guide element for positioning it vertically, and including means operatively connecting said cross slide with the frame, means responsive to the relative movement of said members for moving said workpiece guide element in opposite directions perpendicular to the plane of workpiece travel between workpiece assembled position at said feeding station and disassembled position at said discharge station including a cam fixed relative to said outer member coacting with said vertical slide for moving said workpiece guide element perpendicular to the plane of workpiece travel between the aforesaid positions, guide element and feeder drive means responsive to relative movement of said members for moving during feeding said guide element and feeder and for moving during form rolling said guide element relative to the stationary member at approximately one-half the speed of said relative movement with said guide element and feeder both moving in generally the same direction at generally the same speed corresponding to the advancing direction and speed of said workpiece, said guide element drive means including a main drive mechanism providing drive to said guide head frame at substantially one-half the speed of said relative movement, including a longitudinal slide operatively connecting said cross slide and guide element as part of said guide head and movable in back and forth directions relative to said frame and said cross slide along the line of workpiece travel and permitting endwise movement of said guide element, and including a cam fixed relative to said outer member for moving said longitudinal slide in one of the aforesaid directions for providing drive to said guide element relative to said guide frame to compensate for the curvature of the cylindrical surfaces of said members, said main drive means including a planetary gear drive operatively connecting said members and guide head frame, and a cam fixed relative to said outer member for moving said cross slide in one of the aforesaid directions between the aforesaid positions, whereby said workpiece guide elements aids in maintaining rolled form concentricity with the workpiece, in maintaining rolled form axis orientation, and in minimizing rolled form damage.

21. The combination of claim 20 wherein said workpieces have cylindrical peripheral guide surfaces, and said workpiece guide element is a sleeve telescopically associatable over the workpiece guide surface.

22. In an attachment for a machine for rolling forms on cylindrical peripheral surfaces of cylindrical workpieces wherein inner and outer members have cylindrical surfaces located approximately the same distance apart to form a gap within which the workpiece peripheral cylindrical surface rolls against the surfaces of said members from feeding to discharge stations as the inner member rotates relative to the outer member to move the workpieces in said gap in an advancing direction in a plane perpendicular to the axis of rotation with the inner member being rotatably mounted and the outer member being stationary, a workpiece feeder at said feeding station for feeding workpieces one at a time into said gap, a workpiece guide head including a frame movable in the direction of the workpiece advance, including a workpiece guide element providing workpiece guiding action during form rolling telescopically associatable with the workpiece by movement perpendicular to the plane of workpiece travel between guide and released positions respectively at said feeding and discharge stations, including a vertical slide operatively connected to said frame for endwise vertical reciprocation and having a yoke rotatably carrying said guide element for positioning it vertically, and including a slide type guide element carrier movable along said yoke in back and forth directions relative to said frame along the line of workpiece travel, means responsive to the relative movement of said members for moving said workpiece guide element in opposite directions perpendicular to the plane of workpiece travel between workpiece assembled position at said feeding station and disassembled position at said discharge station including a cam fixed relative to said outer member coacting with said vertical slide for moving said workpiece guide element perpendicular to the plane of workpiece travel between the aforesaid positions, guide element and feeder drive means responsive to relative movement of said members for moving during feeding said guide element and feeder and for moving during form rolling said guide element relative to the stationary member at approximately one-half the speed of said relative movement with said guide element and feeder both moving in generally the same direction at generally the same speed corresponding to the advancing direction and speed of said workpieces, said guide element drive means including a first mechanism providing drive to said guide head frame at substantially one-half the speed of said relative movement and including a second mechanism permitting movement of said guide element carrier in one of the aforesaid directions relative to said guide frame and yoke to compensate for the curvature of the cylindrical surfaces of said members, said first mechanism including a planetary gear drive operatively connecting said members and guide head frame, one end of said yoke having a stop for said carrier, and resilient means operatively connecting said guide element carrier and vertical slide for urging said element in one of said aforesaid directions against said stop to a position therebetween for permitting guide element association with the workpiece at said feeding station, whereby said workpiece guide element aids in maintaining rolled form concentricity with the workpiece, in maintaining rolled form axis orientation, and in minimizing rolled form damage.

23. The combination of claim 22 wherein said workpieces are hollow cylindrical workpieces and wherein said guide element is a spindle telescopically associatable within the bore of said workpiece.

References Cited in the file of this patent
UNITED STATES PATENTS 2,662,430     Fray _________________ Dec. 15, 1953
2,705,895     Batchelder ____________ Apr. 12, 1955